(12) United States Patent
Tebbenhoff et al.

(10) Patent No.: US 9,529,901 B2
(45) Date of Patent: Dec. 27, 2016

(54) HIERARCHICAL LINGUISTIC TAGS FOR DOCUMENTS

(71) Applicant: ORACLE INTERNATIONAL CORPORATION, Redwood Shores, CA (US)

(72) Inventors: Peter Tebbenhoff, Bedford, NH (US); Gerhard Brugger, Los Angeles, CA (US); Navneet Chakravarti, West Hollywood, CA (US); Timothy Eager, Fullerton, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 425 days.

(21) Appl. No.: 14/082,251

(22) Filed: Nov. 18, 2013

(65) Prior Publication Data
US 2015/0142794 A1   May 21, 2015

(51) Int. Cl.
G06F 17/30 (2006.01)

(52) U.S. Cl.
CPC .............................. *G06F 17/30722* (2013.01)

(58) Field of Classification Search
None
See application file for complete search history.

(56) References Cited

U.S. PATENT DOCUMENTS

| | | | |
|---|---|---|---|
| 8,271,865 B1* | 9/2012 | Bennett | G06F 17/30702 704/1 |
| 2003/0176996 A1* | 9/2003 | Lecarpentier | G06F 17/272 704/7 |
| 2004/0030554 A1* | 2/2004 | Boxberger-Oberoi | G10L 13/00 704/260 |
| 2005/0119885 A1* | 6/2005 | Axelrod | G10L 15/063 704/231 |
| 2007/0136252 A1* | 6/2007 | Teare | G06F 17/3089 |
| 2009/0112845 A1* | 4/2009 | Byers | G06F 17/30696 |
| 2009/0125497 A1* | 5/2009 | Jiang | G06F 17/30669 |
| 2009/0182551 A1* | 7/2009 | Cao | G06F 17/30241 704/8 |
| 2011/0035206 A1* | 2/2011 | Hale | G06F 19/3487 704/2 |

(Continued)

OTHER PUBLICATIONS

Mike Uschold; "Creating, Integrating and Maintaining Local and Global Ontologies", Mathematics and Computing Technology; pp. 1-5; Phantom Works, The Boeing Company, Seattle, WA.

(Continued)

*Primary Examiner* — Richard Bowen
(74) *Attorney, Agent, or Firm* — Kraguljac Law Group, LLC

(57) ABSTRACT

Systems, methods, and other embodiments associated with linguistic tags for documents are described. In one embodiment, a method includes receiving a document. The example method includes applying a language tag value to a language tag of the document and applying a locale tag value to a locale tag of the document. The language tag and the locale tag are assigned positions in a hierarchy of linguistic tags such that the language tag inherits from the locale tag. The example method may also include storing the document, the language tag value, and the locale tag value in a memory.

17 Claims, 6 Drawing Sheets

(56) References Cited

U.S. PATENT DOCUMENTS

2012/0185824 A1\* 7/2012 Sadler ................... G06F 9/548
717/120
2015/0066805 A1\* 3/2015 Candee .............. G06Q 30/0282
705/347

OTHER PUBLICATIONS

Monnet; "Multilingual Ontologies for Networked Knowledge", (Home Page), downloaded Jul. 18, 2013; pp. 1; from: http://www.monnet-project.eu/Monnet/Monnet/English?init=true.
Monnet; "Multilingual Ontologies for Networked Knowledge", (About Monnet), downloaded Jul. 18, 2013; pp. 1-2.
Monnet; "Multilingual Ontologies for Networked Knowledge", (Research), downloaded Jul. 18, 2013; pp. 1-2.

\* cited by examiner

| Document 210 | Document 220 | Document 230 | Document 240 |
|---|---|---|---|
| Italian 211 | | | |
| Italian 212 | Italian 222 | English 232 | English 242 |
| Roman 213 | Venetian 223 | Canadian 233 | American 243 |

Global Tag Value / Language Tag Value / Locale Tag Value

FIG. 2

HIERARCHICAL LINGUISTIC TAGS FOR DOCUMENTS

BACKGROUND

The increasing complexity of technology based products has resulted in the necessity of technical support. Perplexed users rely on documentation, call center employees, and the Internet to learn how to use and troubleshoot the products (e.g., electronic devices, appliances, automobiles) that they rely on. For example, as new issues are discovered, documentation is generated to resolve those issues. When a user encounters the issues, the user may be referred to the documentation. However, the documentation may have been authored in a language or to dialect unknown to the user. Therefore, the user may have access to relevant technical support, but the technical support documentation may not be in a language or dialect spoken by the user. Alternatively, when searching through documentation, a language or dialect specified by the user may be available, but not be prioritized in the search. Accordingly, the user may not be made aware that a more tailored result is available.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 2 illustrates an example of four documents having hierarchical linguistic tags.

DETAILED DESCRIPTION

Technical support enterprises want the ability to create documentation for larger audiences. If a document would help a user speaking English in America, that document should be available to other English speaking locales in other dialects such as Canadian English and Australian English. The document should also be available in other languages. There may be documents (e.g., copyright statement, disclaimer, security alert) that should be displayed across all languages, regardless of whether it is available in a single language or multiple languages.

Likewise, users querying technical support documentation may wish to receive documentation in a specific language or a dialect. However, relevant documentation may have been initially authored in a different language. If the documentation is not available in the desired language, the user may prefer to receive the documentation in a different language rather than not receiving results to the user's query.

Described herein are systems and methods for applying hierarchical linguistic tags to documents. Linguistic tags, such as global, language, and locale tags are included with the metadata of a document. Values indicative of different languages or dialects are applied to the linguistic tags to indicate the language and dialect of the document. The document may have values for multiple linguistic tags such as the global tag, language tag, and/or locale tag. For example, a document authored by an American, may have a global tag "EN" indicating that the document was originally drafted in English. The language tag would also be EN since the document is in English. The locale tag would be US indicating that the document was drafted in the dialect of American English as opposed to "AU" Australian English or "GB" British English.

Systems and methods described herein also facilitate searching for a document in a specific language or dialect. A user can perform a search for a document in a dialect by identifying a specific value for the locale tag, such as "American" English language. Alternatively, a user may choose to search for documents in a certain language but not limit the search to certain dialect. For example, if the differences between the dialects of a language are minor, such as in English, a user may choose not to narrow the results of a query to a specific dialect. In some circumstances, the user may search for documents with a global tag if the language of the document is not important to the user. For example, if the user has access to translation services, the user may choose to search for a version of the document with a global tag value that indicates that the document is in the original language to limit translation errors.

Figure 1:
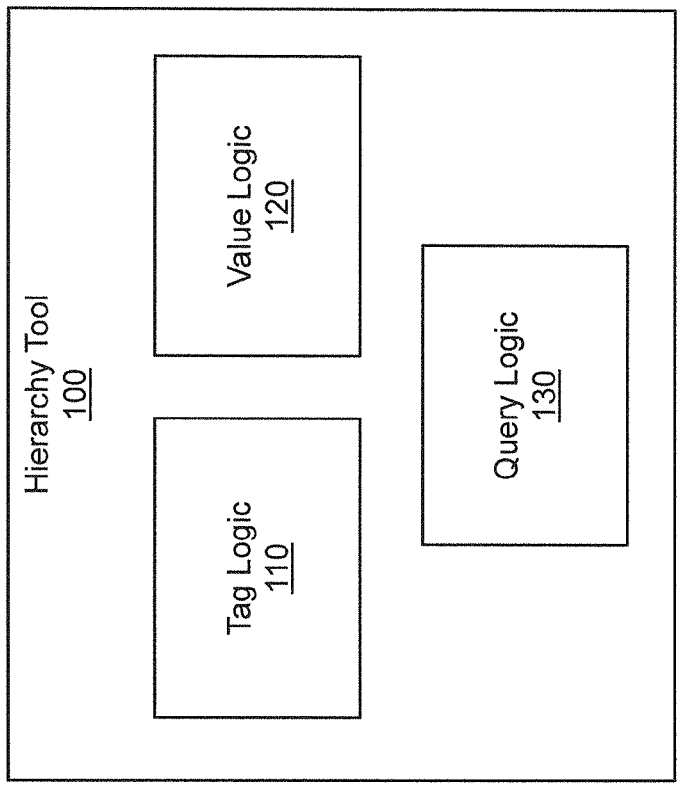
FIG. 1 illustrates one embodiment of an apparatus associated with hierarchical linguistic tags for documents.

FIG. 1 illustrates one embodiment of a hierarchy tool 100 associated with hierarchical linguistic tags. The hierarchy tool 100 has a tag logic 110, a value logic 120, and a query logic 130. When a document (e.g., technical support document, white page, manual, Frequently Asked Question (FAQ) response, contract, image) is received by the hierarchy tool 100, the tag logic 110 searches the document for hierarchically related linguistic tags that identify the language of the document.

If the tag logic 110 finds linguistic tags in the document that are not hierarchically related to one another, the tag logic 110 arranges the linguistic tags in a hierarchy such that the language tag inherits from the locale tag, and the global tag inherits from the language tag. If linguistic tags are not found in the document, the tag logic 110 appends linguistic tags to the document. Specifically, the tag logic 110 can generate a global tag, language tag, and/or a locale tag and append the tags to the existing metadata of the document such that the linguistic tags are hierarchically related to one another.

The value logic 120 applies a linguistic tag value to one or more of the linguistic tags if any linguistic tags do not have linguistic tag values. The linguistic tag values represent the language of the document. For example, a document is drafted in American English, the value logic applies two linguistic tag values: the language tag gets a value of English and the locale tag gets a value of American. Additionally, if the document was originally drafted in American English, a linguistic tag value of English would be applied to the global tag to indicate that English is the language of the document in its original form. In another embodiment, a document is originally drafted in English and has a global tag value that indicates English as the language of the document in its original form. If the document is then translated into French and German, the author may decide to change the global tag to a global tag value indicating German. The author may change the global tag if, for example, a translated document is considered to be better than the original. The linguistic tags are intended to aid a user and are optional in that an author may choose not to apply a value to one or more of the linguistic tags or change the value of a linguistic tag.

A query logic 130 receives requests for documents having specified values for the linguistic tags. For example, a user may request documents in the American dialect. The query logic 130 will search for documents having a locale tag value corresponding to the American dialect. If documents in an American dialect are not found, the query logic will search for documents using the next linguistic tag in the hierarchy. Thus, in this example, the query logic would search for documents having a language tag value of English.

FIG. 2 illustrates an example of hierarchical linguistic tags for documents. Document 210 is a car manual drafted in the Roman dialect of Italian. Accordingly, a global tag of Document 210 is given a global tag value of Italian 211 which indicates that the original language of Document 210 is Italian. A language tag of Document 210 is given a language tag value of Italian 212 because Document 210 is in the Italian language. The language tag is derived from the global tag because both tags reflect the language of the document if the document is an original document. While the global tag and language tag may appear to be redundant because they will have the same value, the global tag is used to indicate that the document is in its original language. Conversely, the language tag value indicates the current language of the document regardless of whether the current language is the original language of the document.

A locale tag of Document 210 is given a locale tag value of Roman 213 because Document 210 is drafted in the Roman dialect of Italian. Therefore, the locale tag value is derived from the language tag value in that the locale tag value is a dialect of the language identified by the language tag value. Accordingly, the linguistic tags as well as the values associated therewith are hierarchically related to one another.

Document 220 is a translation of Document 210 into the Venetian dialect. Document 210 may have been translated for any number of reasons, for example, Venetian car owners may be subject to the same problems with their vehicles as their Roman counterparts. Because Document 220 is a translation, Document 220 does not have a global tag value. The language tag of Document 220 is Italian 222 because Document 220 is still in Italian. However, the locale tag value of Document 220 is Venetian 223 because Document 220 has been translated from the Roman dialect into the Venetian dialect.

Document 230 is a translation of Document 210 into Canadian English. As with Document 220, Document 230 does not have a global tag value because Document 230 is a translation. However, because Document 230 has been translated into a new language, the language tag value is no longer Italian. Instead, the language tag value of Document 230 is English 232. The locale tag value of Document 230 is Canadian 233 to denote that the Document 230 is in Canadian English. Document 240 is a translation of Document 230 into American English. The language tag value is therefore English 242 since Document 240 is in English and the locale tag value is American 243.

Figure 3:
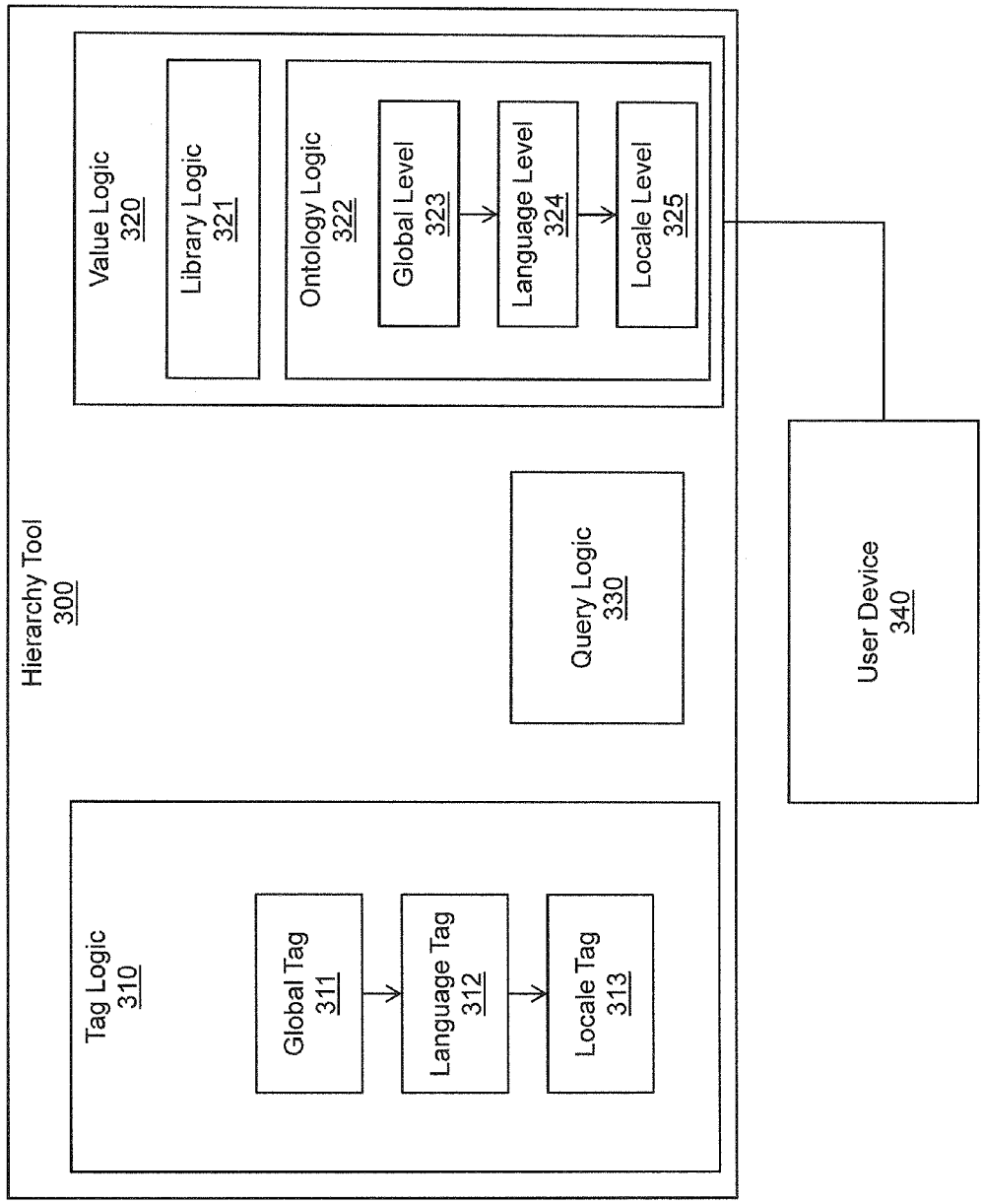
FIG. 3 illustrates one embodiment of an apparatus associated with hierarchical linguistic tags including a global tag, language tag, and locale tag for documents.

FIG. 3 illustrates an embodiment of a hierarchy tool 300. The hierarchy tool 300 has a tag logic 310, value logic 320, and query logic 330 that operate in a similar manner as the tag logic 110, the value logic 120, and query logic 130, respectively, described with respect to hierarchy tool 100 of FIG. 1. The tag logic 310 is configured to determine if a document has linguistic tags, as well as create and arrange linguistic tags in a hierarchy. The linguistic tags include a global tag 311, language tag 312, and locale tag 313. The value logic 320 has a library logic 321 and an ontology logic 322. The ontology logic 322 has a global level 323, language level 324, and locale level 325. The hierarchy tool 300 communicates with a user device 340.

The tag logic 310 identifies linguistic tags such as the global tag 311, language tag 312, and locale tag 313 in a document. The global tag 311 is used to indicate the original language of the document. The language tag 312 indicates the language of the document. If the language tag 312 indicates a different language than the global tag 311, then the document has been translated from the language indicated by the global tag 311 to the language indicated by the language tag 312. The locale tag 313 indicates a dialect of the language specified by the value of the language tag 312. The locale tag 313 may be a specific variety of a language that is characteristic of a particular group of the language's speakers. The locale tag 313 may also be indicative of regional speech patterns.

The global tag 311, language tag 312, and locale 313 are hierarchically related to one another. For example, the value of the locale tag 313 is based, at least in part, on the value of the language tag 312 because the value indicated by the locale tag 313 is dialect of the language indicated by the language tag 312. Alternatively, the value of the language tag 312, may be based in part, on the value of the locale tag 313, since the value language tag 312 indicates the language of the dialect indicated by the locale tag 313. In this manner, the language and locale tags inherit meaning from the other tags.

While three linguistic tags are shown, the tag logic 310 may include additional linguistic tags, for example, a regional tag or a territory tag to give users and technical support enterprises more or less granular control to apply linguistic tags and search for linguistic tags.

The values applied to linguistic tags may be selected by the value logic 320 from the library logic 321. The library logic 321 contains a catalog of values for the linguistic tags. The library logic 321 also facilitates a user adding new values. For example, if a document is translated into a language not previously used by the hierarchy tool 100. A user can add tag values to the library logic 321 for the translated language. The value logic 320 applies the new value to the corresponding linguistic tag in the translated document. A value corresponding to a dialect of the translation may be applied to the locale tag 313 of the document.

The ontology logic 322 contains multilingual synonyms for concepts at multiple levels including a global level 323, a language level 324, and a locale level 325. To apply values to the global tag 311, language tag 312, and global tag 313, the ontology logic 322 determines the correct language by searching tokens (e.g., words) of the document for clues as to the language of the document.

Words that are globally known are stored at the global level 323. Words at the global level 323 may be product names such as iPhone® or Starbucks®. The product names stored in the global level may be mapped to synonyms in different levels. For example the term Starbucks® may be mapped to phrase "coffee shop" in the language level 324.

Synonyms in multiple languages are stored at the language level 324. For example, for the phrase coffee shop, the language level 324 would include "coffee house" in English, "cafeteria" in Spanish, "cafe" in French and so on. Synonyms and related words in different languages may also be included such as "café' in Spanish and "patisserie" in French.

Locale specific words are stored at the locale level 325. For example, Parisians may use the name of a nearby coffee shop as a colloquial term for coffee shop. Accordingly, the locale level 325 may store the phrase CAFÉ DES 2 MOULINS as terminology for coffee shop. Alternatively, some words are locale specific. For example, the word "boot" is an English term. However, used in a British dialect a "boot" indicates the trunk of the car, while the term "boot" used in an American dialect indicates footwear. Therefore, the ontology logic 322 may link synonyms to other words. For example, "boot" when used with words like "car" may indicate that a document is in the British dialect of the English language, whereas "boot" used with the word "sock" may not be enough information to indicate a dialect.

The ontology logic 322 accesses a document provided by the hierarchy tool 300. If the token "patisserie" is identified by the ontology logic 322, the ontology logic 322 searches the levels to find a match for the token. The word patisserie is found at the language level 324 and is mapped to the value "French." Accordingly, the document is given a value to the language tag 312 corresponding to the French. The ontology logic 322 may search the tokens of the document to determine if a predetermined number of the tokens correspond to a single language or dialect before applying a value to a linguistic tag.

The user has an operable connection to the hierarchal tool 100 using a user device 340. The user device 340 may be the source of the document being tagged. In one embodiment, the user accesses the hierarchical tool 300 to use the value logic 320. Specifically, the user device 340 may access the value logic 320 to allow the user apply a value to a linguistic tag. In another embodiment, the value logic 320 accesses the user device 340 to determine which values to apply to linguistic tags. The value logic 320 may determine which values to apply to a document based at least in part on the device settings (e.g., system language, time zone settings) or operable connection settings (e.g., IP address, internet service provider).

Figure 4:
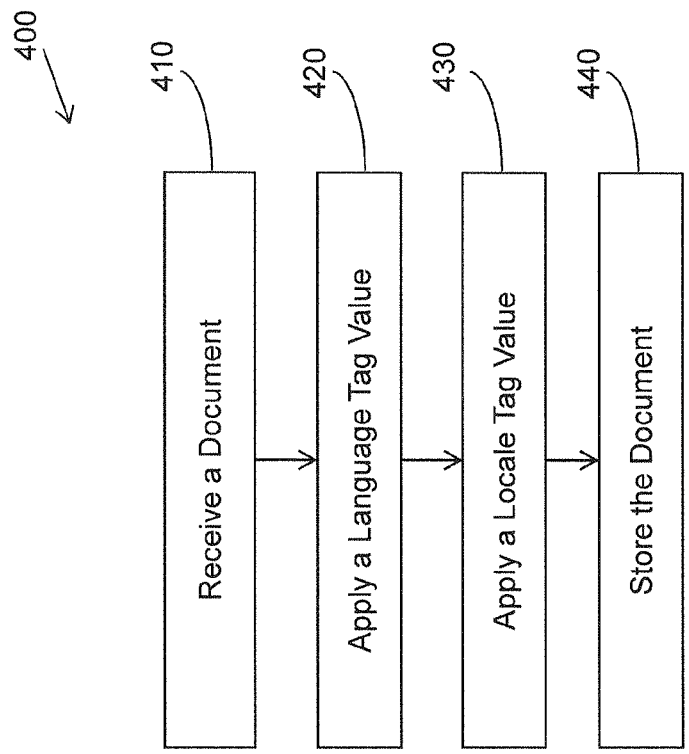
FIG. 4 illustrates one embodiment of a method for applying values to hierarchical linguistic tags for documents.

FIG. 4 illustrates one embodiment of a method 400 for applying values to hierarchically related linguistic tags. At 410, a document is received. The document may be received from an author. Alternatively, the document may be received from a database. The received document has linguistic tags including a global tag, a language tag, and a locale tag. The linguistic tags are used to categorize the language of the document. At 420, a language tag value is applied to the language tag. At 430, a locale tag value is applied to the locale tag. Values stored in the linguistic tags identify the language of the document. In one embodiment, the language tag inherits from the locale tag.

When creating or editing a document, the author can select the linguistic scope of the document by applying a value to a linguistic tag. The author may manually enter the value or the value may be determined automatically. In one embodiment, the internet protocol (IP) address of the electronic device used to draft the document is used to determine the location of the author and the value is set accordingly. Values may be set automatically based on the language the document was drafted in as determined by an application (e.g., applet, word processor) or the settings of the electronic device the document was drafted on.

Alternatively, the value for a linguistic tag may be provided by the author of the document when the document is initially stored. A value may also be determined from the document itself. For example, a value may be determined from characters, special characters, or kanji. The value may be determined by words used in the document. For example, words used in the document may be searched for in multiple lingual dictionaries to determine the language of the words and consequently the document.

At 440 the document having the locale tag value applied to the locale tag and the language tag value applied to the language tag is stored in a memory or database. The memory or database is searchable such that the document can be subsequently retrieved by searching for documents with the desired linguistic tag values.

Figure 5:
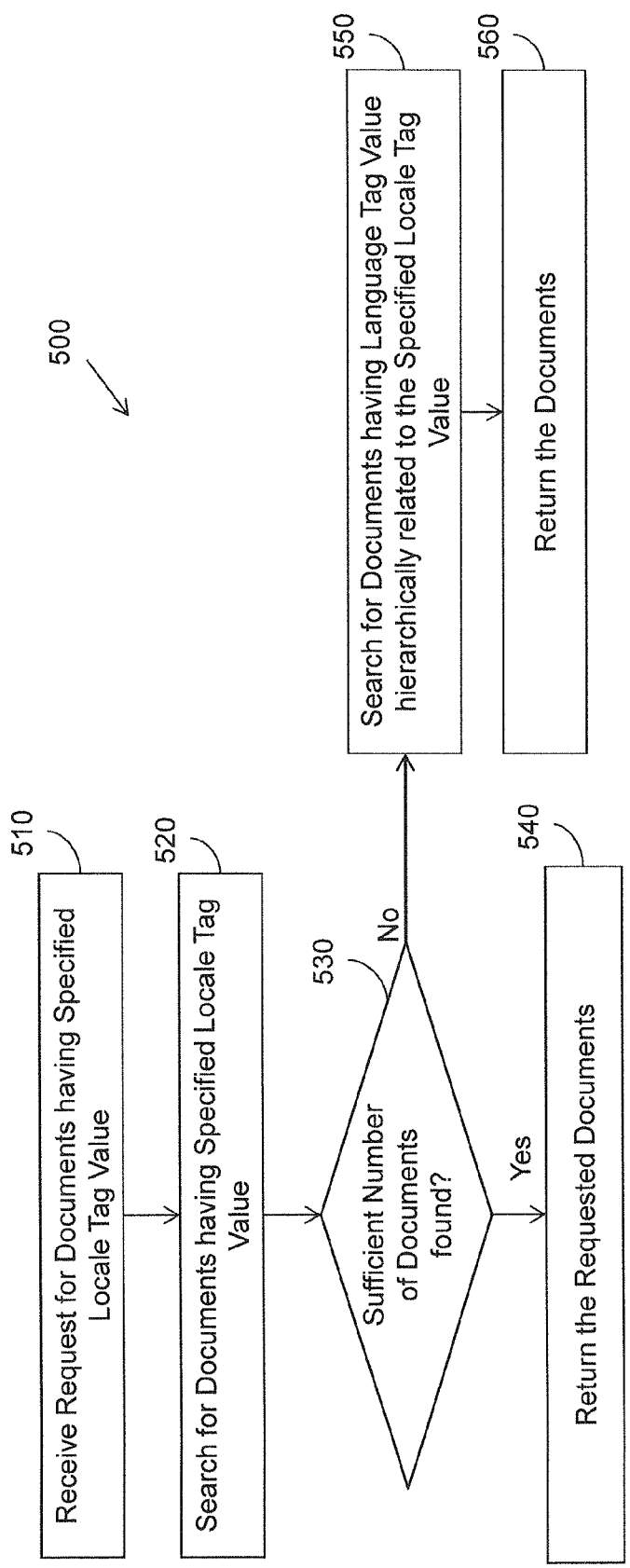
FIG. 5 illustrates one embodiment of a method for searching for documents having hierarchical linguistic tags.

FIG. 5 illustrates one embodiment of another method 500 associated with searching for documents having hierarchical linguistic tags. At 510, a request for documents having a specified locale tag value is received. In one embodiment, a user selects the dialect corresponding to the specified locale tag. For example, a user may select Mexican as a dialect. In another embodiment, the dialect is automatically selected based on the dialect of the user as determined by the dialect of the request. The dialect may be determined based on web browser settings or the internet protocol (IP) address of the source of the request, or an ontology logic.

At 520, documents having the locale tag value are searched for in a database of documentation. The documentation may be searched for locally or remotely. At 530, it is determined whether a sufficient number of documents are available in the selected dialect. The sufficient number may be predetermined number used for requests or may be a predetermined number received with the request. If a sufficient number of documents are found having the specified locale tag value, the method proceeds to 540 where the requested documents are returned.

If a sufficient number of documents are not found, the method 500 proceeds to 550, where documents having a language tag value that is hierarchically "above" the specified locale tag value are searched for. In one embodiment, a user selects a value for the language tag of the document. For example, if the document was not found in the Mexican locale, a user may select to search for documents in the Spanish language. In another embodiment, the language tag value is automatically determined based on the specified locale tag value. In this embodiment, the relationships between dialects and languages are known. For example the relationships between languages and dialects may be stored in a library logic as shown in FIG. 2.

At 560, the documents found in the search at 550 are returned as a result to the request. Any documents with the specified locale tag value (e.g., Mexican) may be prioritized with the results. Therefore, the systems and methods described herein teach applying hierarchically related linguistic tags and searching for documents having linguistic tags. The linguistic tags are hierarchically related to one another such that if a linguistic tag yields insufficient results a broader linguistic tag can be used to search for results. The hierarchical nature of the linguistic tags facilitates retrieving documents tailored to a user.

Figure 6:
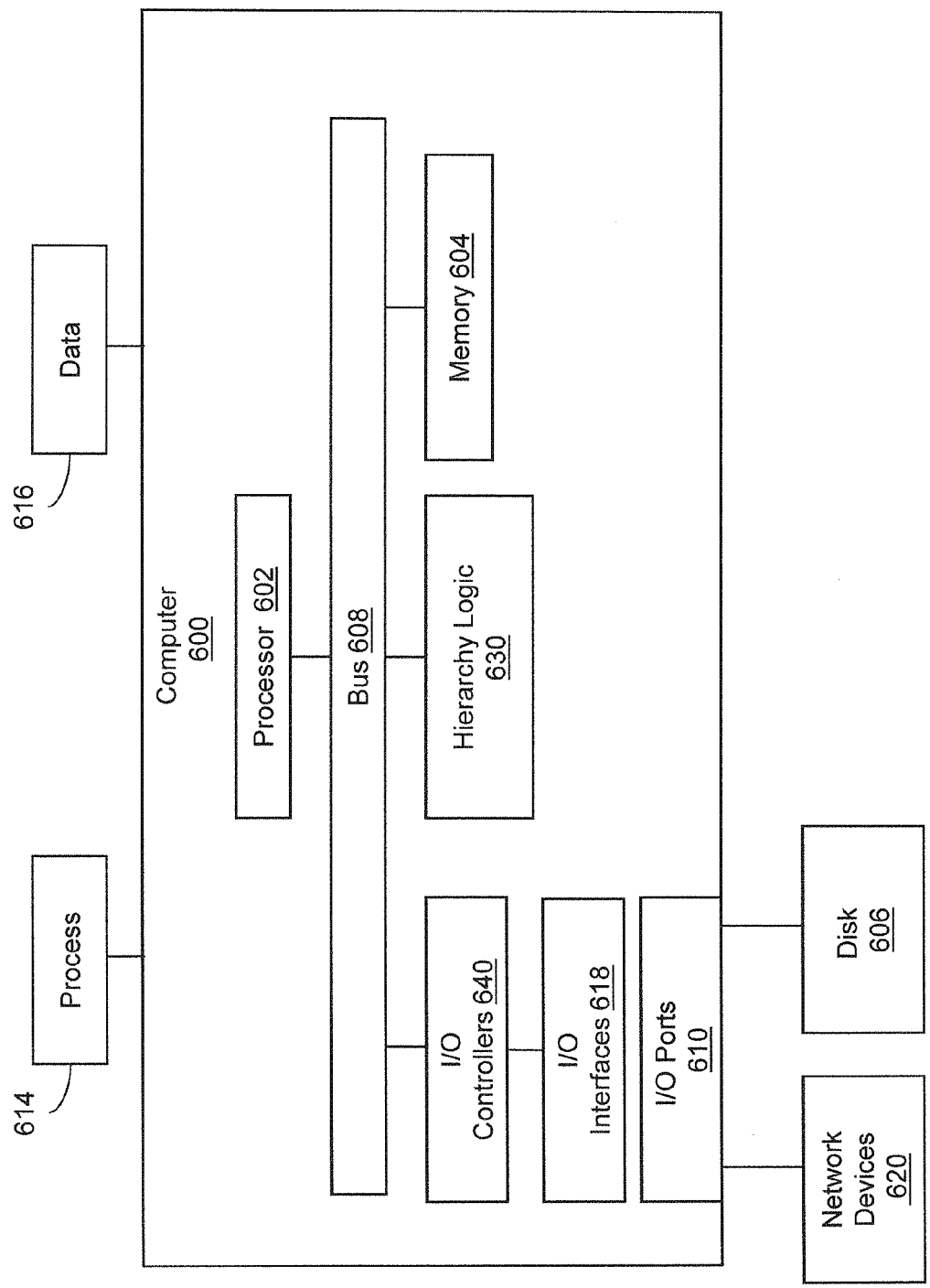
FIG. 6 illustrates an embodiment of a computing system in which example systems and methods, and equivalents, may be implemented.

FIG. 6 illustrates an embodiment of a computing system in which example systems and methods, and equivalents, may be implemented. FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include a hierarchy logic 630 configured to facilitate applying linguistic tags and searching for documents having linguistic tags for language that are hierarchically related. The hierarchical nature of the linguistic tags facilitates retrieving documents tailored to a user. The hierarchy logic 630 operates in a similar manner as the hierarchy tool 100 shown in FIG. 1. In different examples, the hierarchy logic 630 may be implemented in hardware, a non-transitory computer-readable medium with stored instructions, firmware, and/or combinations thereof. While the hierarchy logic 630 is illustrated as a hardware component attached to the bus 608, it is to be appreciated that in one example, the hierarchy logic 630 could be implemented in the processor 602.

In one embodiment, the hierarchy logic 630 or the computer is a means (e.g., hardware, non-transitory computer-readable medium, firmware) for applying linguistic tags and searching for documents having specified values for linguistic tags. The linguistic tags are indicative of language and are hierarchically related. The hierarchical nature of the linguistic tags facilitates retrieving documents tailored to a user.

The means may be implemented, for example, as an ASIC programmed to apply linguistic tags and search for documents having specified values for linguistic tags. The means may also be implemented as stored computer executable instructions that are presented to computer 600 as data 616 that are temporarily stored in memory 604 and then executed by processor 602.

The hierarchy logic 630 may also provide means (e.g., hardware, non-transitory computer-readable medium that stores executable instructions, firmware) for identifying the linguistic tag and determining that the linguistic tags are hierarchically related to one another. The computer readable medium further stores executable instructions to apply a value to one or more of the linguistic tags.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods described with reference to FIGS. 1-5.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. The computer-readable medium described herein are limited to statutory subject matter under 35 U.S.C §101.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. The logic described herein are limited to statutory subject matter under 35 U.S.C §101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing instructions that, when executed by one or more processors of a computing device, cause the computing device to at least:
   receive an electronic document from a drafter;
   apply a language tag value to a language tag of the electronic document via the one or more processors, where the language tag defines a language, and wherein the language tag value is applied based, at least in part, on words used in the electronic document and on an internet protocol address of the drafter;
   apply a locale tag value to a locale tag of the electronic document via the one or more processors, where the locale tag defines a dialect of the language; and
   store the electronic document, the language tag value, and the locale tag value in a memory, via the one or more processors, where the language tag and the locale tag are assigned positions in a hierarchy of linguistic tags such that the language tag inherits a linguistic relationship from the locale tag, where the linguistic relationship is between dialects and languages.

2. The non-transitory computer-readable medium of claim 1, wherein the instructions further comprise instructions that, when executed by the one or more processors, cause the computing device to retrieve the electronic document from the memory based, at least in part, on the language tag value and the locale tag value.

3. The non-transitory computer-readable medium of claim 1, wherein the instructions further comprise instructions that, when executed by the one or more processors, cause the computing device to apply a global tag value to a global tag that is assigned a position in the hierarchy of linguistic tags.

4. The non-transitory computer-readable medium of claim 1, wherein the instructions further comprise instructions that, when executed by the one or more processors, cause the computing device to:
   receive a translated document corresponding to a translation of the electronic document into a second language and a second dialect; and
   apply a language tag and a locale tag having values corresponding to the second language and the second dialect to the translated document.

5. The non-transitory computer-readable medium of claim 1, wherein the instructions further comprise instructions that, when executed by the one or more processors, cause the computing device to determine the language tag value of the electronic document by comparing words of the electronic document to tokens in a glossary of words in different languages.

6. A non-transitory computer-readable medium storing instructions that, when executed by one or more processors of a computing device, cause the computing device to at least:
   receive a computerized request from a user, via the one or more processors, for documents having a locale tag value, in a locale tag, corresponding to a desired dialect of a language;
   search for electronic documents in a database device having the locale tag value via the one or more processors;
   determine, via the one or more processors, whether at least a predetermined number of electronic documents having the locale tag value are returned by the search;
   when the predetermined number of electronic documents have not been returned, search the database device, via the one or more processors, for electronic documents having a language tag value in a language tag associated with the locale tag value, where the language tag defines a language based, at least in part, on words used in a corresponding electronic document of the electronic documents and an internet protocol address of a drafter of the corresponding electronic document, where the language tag and the locale tag are assigned positions in a hierarchy of linguistic tags such that the language tag inherits a linguistic relationship from the locale tag, and where the linguistic relationship is between dialects and languages; and return electronic documents, as search results, having the language tag value via the one or more processors.

7. The non-transitory computer-readable medium of claim 6, wherein the instructions further comprise instructions that, when executed by the one or more processors, cause the computing device to prioritize any documents having the locale tag value in the returned electronic documents.

8. The non-transitory computer-readable medium of claim 6, wherein the instructions further comprise instructions that, when executed by the one or more processors, cause the computing device to select the language tag value based at least in part on the locale tag value.

9. The non-transitory computer-readable medium of claim 8, wherein the instructions further comprise instructions that, when executed by the one or more processors, cause the computing device to:

when the predetermined number of electronic documents have not been returned having the specified language tag, searching for electronic documents having a global tag value, where the global tag value indicates the original language of an electronic document.

10. A computer system, comprising:
a processor;
a memory;
a tag module stored in the memory including instructions that when executed cause the processor to receive an electronic document from a user and identify linguistic tags in the electronic document, where the linguistic tags include a global tag, a language tag, and a locale tag arranged in a hierarchy configured for linguistic relationships to be inherited between the linguistic tags based on the hierarchy, and where the linguistic relationships are between at least dialects and languages; and a value module stored in the memory including instructions that when executed cause the processor to electronically apply values to the linguistic tags, where a value of the global tag is based at least in part on a value of the language tag, and where the value of the language tag is based at least in part on the value of the locale tag, and where the language tag defines a language, the locale tag defines a dialect of the language, and the language tag is applied based, at least in part, on words used in the electronic document and an Internet protocol address of the user.

11. The system of claim 10, where the tag logic is configured to arrange the linguistic tags within the hierarchy such that the language tag inherits from the locale tag, and the global tag inherits from the language tag.

12. The system of claim 10, further comprising a query logic configured to search for electronic documents having a specified locale tag value for a locale tag.

13. The system of claim 12, where the query logic is configured to search for electronic documents having a language tag value when a predetermined number of documents having the specified locale tag value are not found.

14. The system of claim 10, where the tag logic is further configured to determine if a document has linguistic tags, and where if the document does not have the linguistic tags the tag logic is configured to create linguistic tags for the document.

15. The system of claim 14, where the value logic is configured to apply values to the linguistic tags in the document based, at least in part, on a source of the document.

16. The system of claim 10, further comprising a library logic storing possible values for the linguistic tags.

17. The system of claim 10, further comprising an ontology logic storing tokens that are mapped to linguistic tag values where the ontology logic is configured to compare tokens to words in the electronic document, and where the value logic is configured to apply linguistic tag values based, at least in part, on the comparison.

* * * * *

UNITED STATES PATENT AND TRADEMARK OFFICE
CERTIFICATE OF CORRECTION

PATENT NO. : 9,529,901 B2
APPLICATION NO. : 14/082251
DATED : December 27, 2016
INVENTOR(S) : Tebbenhoff et al.

Page 1 of 1

It is certified that error appears in the above-identified patent and that said Letters Patent is hereby corrected as shown below:

In the Claims

In Column 12, Line 13, in Claim 10, delete "Internet" and insert -- internet --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*